Aug. 22, 1944.  A. J. MATTER  2,356,333
HOSE CONNECTOR
Filed July 30, 1942
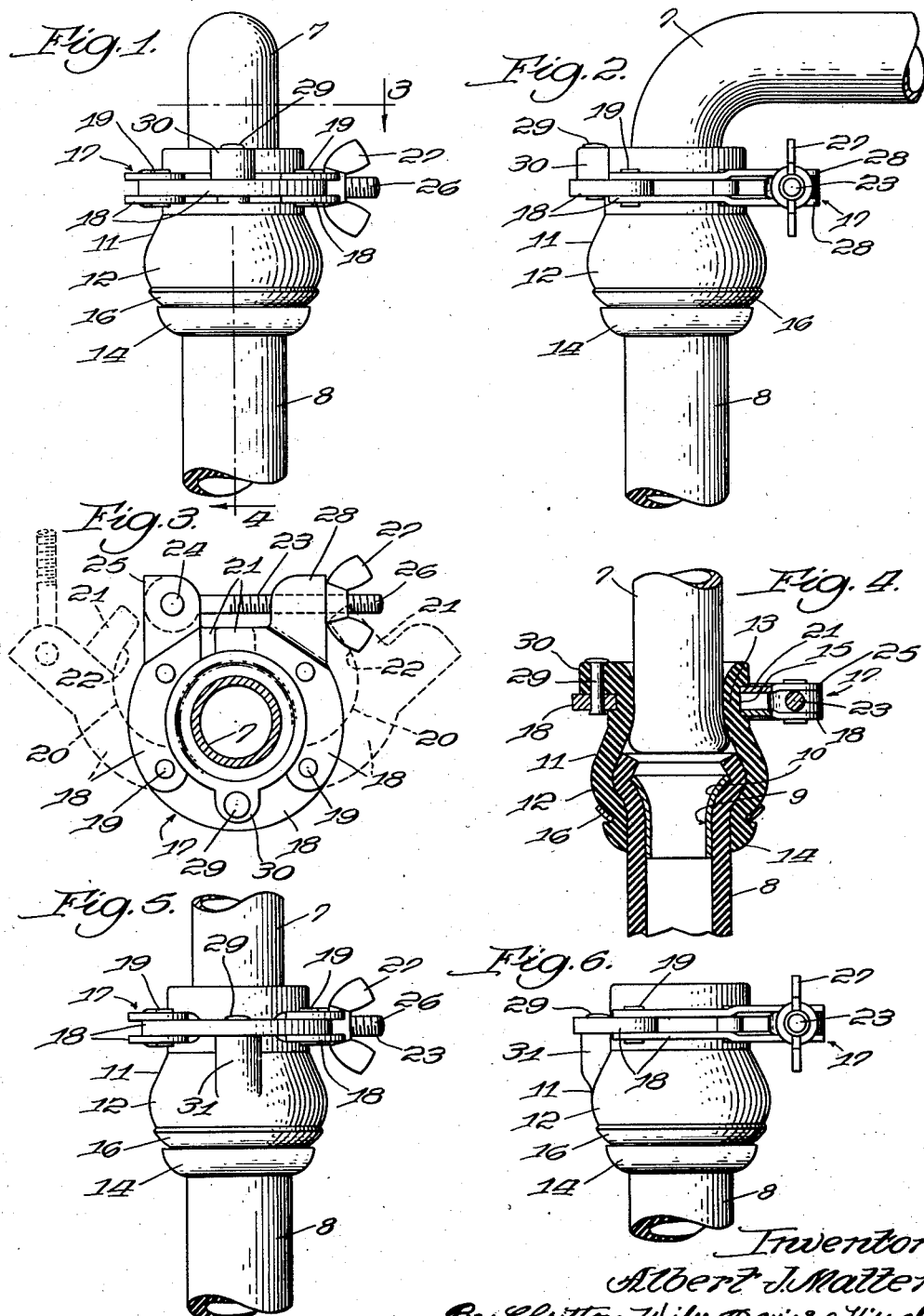

Patented Aug. 22, 1944

2,356,333

UNITED STATES PATENT OFFICE 2,356,333

HOSE CONNECTOR

Albert J. Matter, Park Ridge, Ill.

Application July 30, 1942, Serial No. 452,819

13 Claims. (Cl. 285—77.)

My invention relates to means for connecting a resilient tubular member such as for example a hose, to an object, as for example, and more particularly, though not exclusively, to a faucet of a water service installation, and more especially to a situation in which the joint between the tubular member and the faucet is subjected to high water pressure as in the case of the use of sink flushers, though it may be used to advantage where the joint is subjected to relatively low pressure, as for example in the case of the use of a spray pipe.

My objects generally stated are to provide a connector which may be readily slipped over the object to which it is to be attached, such as for example a faucet either with or without a bulbous discharge end, and be secured thereon against leakage at the joint even when subjected to relatively high pressure in the connector; to provide an improved form of means for making the desired tight joint; to provide such a means which may be readily manipulated into and out of clamping position; and other objects as will be manifest from the following description.

Referring to the accompanying drawing:

Figure 1 is a view in front elevation of a faucet showing a connector in accordance with my invention applied thereto.

Figure 2 is a view in side elevation of the structure shown in Fig. 1.

Figure 3 is a plan sectional view taken at the line 3 on Fig. 1 and viewed in the direction of the arrow, the clamping means thereof being shown by full lines in clamping position and by dotted lines in released position.

Figure 4 is a section taken at the line 4 on Fig. 1 and viewed in the direction of the arrow.

Figure 5 is a view like Fig. 1 of a modification of the invention; and

Figure 6, a view in side elevation of the structure of Fig. 5.

In the particular construction shown a faucet, such as for example a kitchen faucet of a household water system and illustrated as of a type in which its discharge end is bulged, is represented at 7 and a hose, to be connected with the faucet, at 8; the hose, by way of example, constituting a part of a sink flusher operated by water supplied from the faucet under relatively high pressure.

The inlet end of the hose 8 is shown as lined with a metal bushing 9, having a flared end 10 of larger diameter than the hose which, when these parts are assembled together to the position shown in Fig. 4, causes the hose to be outwardly deformed as illustrated, the upper edge of the bushing 9 becoming embedded in the hose.

Surrounding the inlet end of the hose 8 is a tubular member or connector portion 11, preferably formed of soft rubber, the member 11 being of general globular form as represented at 12, terminating at its inlet end in a neck portion 13 and having an external annular flange 14 at its outlet portion located below the flared end of the bushing 9 and a continuous external groove 15 at its neck 13.

The hose 8 extends at its deflected inlet portion within the globular portion 12 of the member 11, these parts being tightly clamped together as by a conical washer 16 which surrounds the member 11 immediately above the flange 14.

The tubular member 11 is preferably of sufficient resiliency and sufficiently thin, as to permit it to be readily slipped at its neck portion 13 over, and withdrawn from, the discharge end of the faucet even when the latter is bulged as shown and still be adapted to be contracted above the bulge sufficiently to insure a tight joint with the faucet even when the fluid delivered from the faucet is under high pressure.

The construction shown also comprises means encircling the tubular member for clamping this member telescopically with the faucet, these means comprising an articulated clamping element 17 formed of a series of rigid links 18 hinged together at 19. Preferably the series comprises three links having arcuate inner surfaces at which to engage the tubular member 11, these surfaces of the end links being represented at 20.

The free ends of the end links are provided with relatively offset projections 21 which, in the clamped position of the element 17, extend into mutually lapped position as shown by full lines in Fig. 3. The inner surfaces of the projections 21 are also arcuate, as represented at 22, and form continuations of the arcuate surfaces 20 of the end links, the links 18, together with the projections 21 on the end ones of these links, constituting in effect an expansible and contractible ring engaging the tubular member 11 throughout the circumference of the latter and serving, when the end links are drawn toward each other, to exert a substantially uniform clamping action against the tubular member 11 throughout its circumference insuring a tight joint between this tubular member and the faucet.

The means shown for clamping the links 18 about the tubular member 11 comprise a rod 23 pivoted at one end, as indicated at 24, to a pair of ears 25 on an end one of the links 18, the opposite end of the rod 23 being threaded as represented at 26; and a wing-nut 27 screwed on the outer threaded end of the rod 23 and against a pair of ears 28 on the other end one of the links 18, the rod 23 extending between the ears 28 when in clamping position as shown in full lines in Fig. 3.

The arrangement of parts described provides a quick detachable connection between the clamping element 17 and the one of the end links carrying the ears 28, the rod 23 being adapted to be swung clear of the ears 28 when the wing-nut 27 is loosened, permitting the end links to be swung outwardly to relatively widely open position as shown by dotted lines in Fig. 3.

In the arrangement shown the clamping means are made unitary with the tubular member 11 by pivotally connecting them at the intermediate one of its links 18, shown as a single link, with the tubular member 11 to extend in registration with the groove 15, by means of a pivot pin 29 mounted in a boss on the tubular member 11 preferably of the resilient material of which the member 11 is made and integral therewith, this boss according to the showing in Figs. 1-4 being represented at 30 and provided on the neck portion 13 at a point above the clamping means and according to the showing in Figs. 5 and 6 being represented at 31 and providing on the globular portion 12 and located below the clamping means.

While I have illustrated and described certain forms of structure constituting embodiments of my invention I do not wish to be understood as intending to limit the invention thereto as the structures shown may be variously modified and altered and the invention embodied in other forms of structure without departing from the spirit of the invention.

What I claim as new and desire to secure by Letters Patent is:

1. The combination with a resilient tubular member to be telescopically connected with an object, of means for clamping said tubular member about the object comprising an articulated clamp element to extend about said tubular member and comprising a series of rigid links hinged together, said clamp element pivotally connected at a link thereof with said tubular member and movable into and out of clamping engagement therewith, and means for clamping said element about said tubular member.

2. A hose connector comprising a resilient tubular member formed of a globular portion having an outlet for telescopic connection with a hose and a neck portion at its inlet integral with said globular portion.

3. In combination, a hose and a connector comprising a resilient tubular member formed of a globular portion having an outlet and a neck portion at its inlet integral with said globular portion, said hose extending into said outlet and means for attaching said hose to said globular portion.

4. In combination, a hose, a tubular element in the inlet end of said hose expanding said hose, a resilient tubular member having an inlet and an outlet, said tubular member disposed at its outlet above the inlet end of said hose and means engaging said tubular member below said tubular element for restraining expansion of said tubular member.

5. In combination, a hose, a tubular element in the inlet end of said hose expanding said hose, a resilient tubular member formed of a globular portion having an inlet and an outlet and a neck portion at its inlet integral with said globular portion, said hose extending at its inlet into said outlet and means engaging said globular portion below said tubular element for restraining expansion of said globular portion.

6. In combination, a globular element having a flexible inlet neck and an outlet portion, a hose, means for maintaining an end of said hose expanded within said outlet portion to provide a connection therewith and means for contracting said inlet neck about a faucet end for making a detachable connection therewith.

7. In combination, a globular element having a flexible inlet neck and an outlet portion, a hose, means for maintaining an end of said hose expanded within said outlet portion to provide a connection therewith and an articulated clamp adapted to contract said inlet neck about a faucet end to make a detachable connection therewith.

8. In combination, a globular element having a flexible inlet neck and an outlet portion, a hose, means for maintaining an end of said hose expanded within said outlet portion to provide a connection therewith and means attached to said globular element for contracting said inlet neck about a faucet end for making a detachable connection therewith.

9. In combination, a hose, a connector of globular form into one end of which an end of said hose is positioned, a bushing in said hose expanding said hose end into tight engagement with said globular connector, the opposite end of said connector having a flaring flexible edge portion expandible over the end of a faucet to which the connector is to be applied, and means attached to said connector for clamping said connector to the faucet.

10. In combination, a hose, a hollow connector having an inlet and an outlet, said hose being positioned in said outlet, and a bushing in said hose and extending into said connector and expanding said hose into tight engagement with said connector.

11. In combination, a hose, a hollow connector having an inlet and an outlet, said hose being positioned in said outlet, and a bushing in said hose having a flaring end portion within said connector and expanding said hose into tight engagement with said connector.

12. In combination, a hose, a hollow connector having an inlet and a constricted outlet, said hose being positioned in said outlet and extending therebeyond into said connector, and a bushing in said hose extending into said connector beyond said outlet and expanding said hose into tight engagement with said connector.

13. In combination, a hose, a hollow connector having an inlet and a constricted outlet, the inlet portion of said connector having a flaring flexible edge portion expandable over the end of a faucet to which the connector is to be applied, means for clamping said connector to a faucet, said hose being positioned in said outlet and extending therebeyond into said connector and a bushing in said hose extending into said connector beyond said outlet and expanding said hose into tight engagement with said connector.

ALBERT J. MATTER.